United States Patent [19]

Draper et al.

[11] Patent Number: 4,567,636
[45] Date of Patent: * Feb. 4, 1986

[54] VEHICLE DOOR CONVERSION

[75] Inventors: David L. Draper, Hamburg; Gerald D. McKee, Highland, both of Mich.

[73] Assignee: Cars & Concepts, Inc., Brighton, Mich.

[*] Notice: The portion of the term of this patent subsequent to Aug. 23, 2000 has been disclaimed.

[21] Appl. No.: 613,246

[22] Filed: May 23, 1984

Related U.S. Application Data

[60] Continuation-in-part of Ser. No. 524,408, Aug. 18, 1983, abandoned, which is a division of Ser. No. 282,043, Jul. 10, 1981, Pat. No. 4,399,600.

[51] Int. Cl.[4] .............................................. B22D 19/10
[52] U.S. Cl. ................................... 29/401.1; 29/426.4; 296/146; 49/502
[58] Field of Search ................ 29/401.1, 426.4, 426.1, 29/402.08; 296/146, 147, 149; 49/502, 506

[56] References Cited

U.S. PATENT DOCUMENTS

| | | | |
|---|---|---|---|
| 2,552,503 | 5/1951 | Ackermans | 296/149 |
| 4,047,751 | 9/1977 | Koike | 296/146 |
| 4,238,876 | 12/1980 | Monroe et al. | 296/224 X |
| 4,261,615 | 4/1981 | Deaver | 29/401.1 X |

FOREIGN PATENT DOCUMENTS 2719403  11/1978  Fed. Rep. of Germany ...... 296/146

Primary Examiner—Howard N. Goldberg
Assistant Examiner—Joseph M. Gorski
Attorney, Agent, or Firm—Brooks & Kushman

[57] ABSTRACT

A method of converting a sedan body having doors with framed and sliding windows to a vehicle body having doors with unframed windows. The method is performed by cutting and removing at least a portion of the window frame and utilizing a glass window panel and seal at least one of which has a different construction than the corresponding component used with the framed door. Preferably, both a different glass window panel and a different seal are utilized.

16 Claims, 11 Drawing Figures

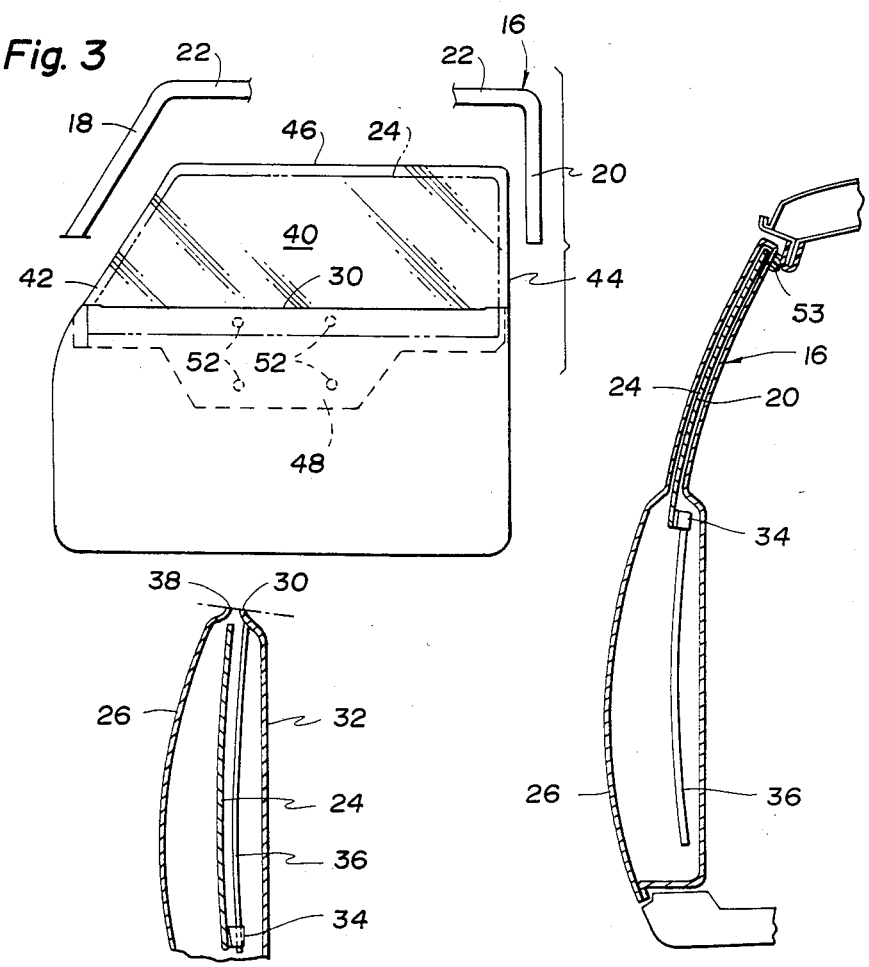

VEHICLE DOOR CONVERSION

CROSS REFERENCE TO RELATED APPLICATIONS

This application is a continuation-in-part of prior application Ser. No. 524,408, now abandoned, which was filed on Aug. 18, 1983 as a division of application Ser. No. 282,043 filed on July 10, 1981 and issued on Aug. 23, 1983 as U.S. Pat. No. 4,399,600.

TECHNICAL FIELD

This invention relates to automotive vehicle bodies and more particularly to a method of converting a sedan type body with framed door windows to a vehicle body having unframed door windows.

BACKGROUND ART

The majority of automobiles of current manufacture have sedan bodies in which the doors have a frame that extends upwardly from the main door portion to guide a generally vertically sliding window. There is, however, a demand for vehicles without framed windows such as vehicles which are to have T-tops, targa tops, folding tops or hard-tops. T-tops are vehicles having a pair of removable panels covering a pair of openings in the roof that are continuous with the door openings, while targa style vehicles have a single opening in the roof extending continuously from one side of the vehicle to the other and continuous with the door openings. In convertibles, the entire top folds and retracts. With such body styles, framed windows in the vehicle doors prevent full advantage intended to be achieved with the removable roof panels or folding top. In hard-top vehicles the door windows are unframed primarily for esthetic purposes.

DISCLOSURE OF INVENTION

It is an object of this invention to provide a method of converting the doors of sedan type vehicles in which the window is framed, to doors having unframed windows.

The method of the invention provides for conversion of sedan type vehicle bodies having framed windows to a vehicle body of the T-top, convertible top, targa top, or hard-top. Particularly with vehicles having roof modifications or changes such as that encountered with the targa, T-top or convertible, the converted door makes it possible to fully utilize the top features and even without such top modifications give the hard top effect.

The method of the invention is performed on a sedan body having a door opening and a door therefor with a window frame defining a window opening. In performing the method, at least part of the window frame is cut and removed from the door. A member is installed in the door in the form of a glass window panel, and another member is installed to the edge of the door opening in the form of a seal that engages the installed window panel when the window is in a closed position. One of the members utilized has a different construction than the corresponding member designed for use with the window frame.

The invention is disclosed as being performed by providing the glass window panel with a different construction than a glass window panel designed for use with the window frame. Preferably, the perimeter of the glass window panel utilized is greater than a window panel designed for use with the window frame. Most preferably, the larger glass window panel is enlarged a greater amount at its lower edge than at its top and side edges as compared to a window panel designed for use with the window frame. Installation of the window panel is performed through the upper edge of the door after the frame has been removed.

The invention is also disclosed as being performed by providing a seal of a different construction than a seal designed for use with the window frame. The modified seal utilized is installed with a spacer between the seal and the edge of the door opening. This spacer preferably disposes the seal at an angle to receive and engage the window panel when the door is moved from an open position to a closed position and when the window panel is moved from an open position to a closed position.

Best results are achieved in performing the method of the invention when both the glass window panel and the seal have different constructions than the glass window panel and seal designed for use with the window frame.

In performing the invention, a stop element is also preferably installed to limit upward movement of the glass window panel. In addition, a guide means is installed adjacent the lower edge of the window panel to hold the window panel relatively stable with respect to the door when the window is in an upper position.

One manner of performing the invention is disclosed as cutting the window frame generally along a horizontal line substantially in alignment with the lower edge of the window opening.

Another manner of performing the invention is disclosed as cutting the window frame to leave a forward portion thereof that extends upwardly from the door and has a terminal rear end. The door is further modified by adding a support that extends vertically between the door and the terminal rear end of the forward portion of the window frame to cooperate therewith in defining a front vent window opening. A vent window glass panel is installed in the vent window opening, and the glass window panel is installed rearward of the vertically extending support.

One other manner of practicing the invention involves cutting the window frame to leave a rear portion that extends upwardly from the door and has an upper terminal end including a restraint belt attachment point.

The objects, features, and advantages of the present invention are readily apparent from the following detailed description of the best modes for carrying out the invention when taken in connection with the accompanying drawings.

BRIEF DESCRIPTION OF DRAWINGS

FIG. 1 is a side elevation view of a sedan type vehicle body having doors with framed windows;

FIG. 2 is a cross-sectional view at an enlarged scale taken generally along line 2-2 in FIG. 1;

FIG. 3 is a view of a door at an enlarged scale shown separately from the remainder of the vehicle after it has been modified;

FIG. 4 is a view similar to FIG. 2 after the door has been partially modified;

BEST MODES FOR CARRYING OUT THE INVENTION

Figure 5:
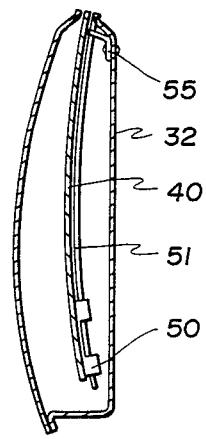
FIG. 5 is a view of the door as in FIG. 4 but after further modification.

Referring to FIG. 1 of the drawings, a sedan type vehicle is shown having a body 10 with a door 12. The door 12 has a window opening 14 formed by a window frame having a forward frame portion 18, a rearward frame portion 20 and a top frame portion 22 connecting the frame portions 18 and 20. The window opening 14 receives a sliding glass window panel 24 which retracts into the lower door body 26 of the door 12.

When the window opening 14 is closed by the glass panel 24 as shown in FIG. 2, the glass panel 24 occupies the space outlined by broken line 28. In that position the entire perimeter of the glass panel 24 is supported by the frame 16 and by a door portion adjacent to the upper edge of the lower door body 26.

The frame 16 and particularly the rearward frame portion 20 acts as a guide and support for the glass panel 24 during vertical movement upon opening and closing of the window opening 14. The door 12 and its opening in the vehicle body 10 as well as the window opening 14 have seals and trim which can vary in detail from vehicle to vehicle and are not illustrated.

Modification of the door 12 as seen in FIGS. 1 and 2 to a frameless door shown in FIGS. 3 through 6 begins with cutting of the forward frame 18 and rearward frame 20 along a horizontal line substantially in alignment with the lower edge of the window opening 14 and the upper edge 30 of the door 12. A severing operation can be conducted with a portable metal saw with the glass panel 24 in its retracted or lowered position within the door body 26 as illustrated in FIG. 4. After severing of the frame 16, it is removed giving a condition as illustrated in FIG. 4. With the glass panel 24 within the door body 26, openings in the inner door panel 32 give access to guide means in the form of a slide 34 fastened to the glass panel 24 and a guide rod or tube 36 fastened to the door body 26. The slide 34 is removed from the window panel 24 to permit the window panel to be removed through the slot 38 (FIG. 4) in the upper edge 30 of the door body 26.

A new glass window panel 40 is then installed which as seen in FIG. 3 has a forward edge 42, a rearward edge 44 and a top edge 46 defining a perimeter larger than the original glass panel 28 which is indicated in dot-dash lines. In addition, the new glass panel 40 has a lower portion 48 which, for the particular door conversion disclosed, extends substantially lower than the lower edge of the original glass panel 24 although this is not necessary in all cases.

The new glass panel 40 is installed through the slot 38 in the top of the door body 26 after which a new guide mechanism including a slide assembly 50 and guide tube 51 are installed through access openings in the inner door panel 32. The slide 50 of the guide mechanism for the particular door conversion disclosed has a greater vertical height than the original slide mechanism 34 although this in not necessary in all cases. Slide 50 is fastened to the glass panel 40 through means of the openings 52 shown in FIG. 3. In addition, the new guide tube 51 is mounted relative to the door body 26.

The additional size of the lower portion 48 and the guide mechanism 50 are required to support the new glass panel 40 and to guide it during movement between a retracted and a raised position to replace the support afforded by the original frame 16. As seen in FIG. 2, the original window frame 16 is available not only to guide and support the glass panel 24 but also to engage a seal 53, typically afforded relative to the door opening and engaging the frame 16. In the modified door, the panel 40 engages a seal 54 of a different construction, and particularly during closing movement of the door the forces applied in a substantially horizontal direction must be overcome by the wider lower portion 42 of the glass panel and guide mechanism 50, 51.

After the new glass panel 40 and guide mechanism 50, 51 are installed a stop element 55 is installed within the door body 26 and is attached to the inner side of the door panel 32. The stop 55 is generally L-shaped and engages the slide mechanism 50 when the window panel 40 is raised to its upper portion when the door is open. In the original framed sedan door, the window frame serves to limit upward movement of the panel 24.

Figure 8:
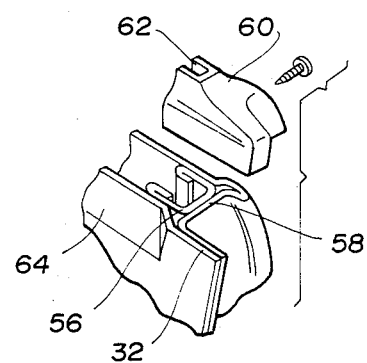
FIG. 8 is a perspective view at an enlarged scale of the upper rear edge of the door with its window frame removed.

After the new glass panel 40 is installed new door moldings and caps must be installed. As shown in FIG. 8, the top rear edge of the door where the frame 16 has been sawed presents raw edges in the form of a channel 56, the top edge of the inner panel 32 and the sheet metal portion 58 forming part of the rearward frame portion 20. These edges are covered by a molded rubber cap 60 which covers the upper edges of the channel 56, panel 32 and end sheet metal 58. The cap 60 forms a guide channel portion 62 to guide and seal the rear edge 44 of the glass panel 40. The cap 60 merges with other moldings such as that indicated at 64 and with a similar cap, not shown, at the forward edge of the door body 26 at the point where forward frame portion 18 has been sawed.

Figure 7:
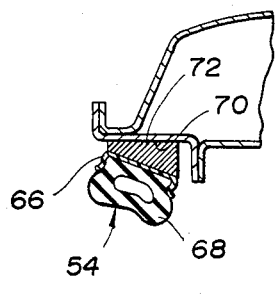
FIG. 7 is a cross-sectional view of a typical seal section used with the modified door.

The original seal 53 is disposed around the door opening above the belt-line, that is, that portion of the seal 53 which originally engaged the door frame 16 is removed and replaced with a new seal 54 of a different construction. The seal 54 includes a channel member 66 and a resilient seal portion 68 disposed in the channel member 66. The channel 66 and seal portion 68 are spaced from the roof edge 70 by a spacer 72, a typical section of which is shown in FIG. 7. The spacer 72 is used to attain the proper angle or attitude of the seal 54 relative to the new glass panel 40 and makes it possible to adjust the perimeter of the door opening by variations in the spacer 72.

Figure 6:
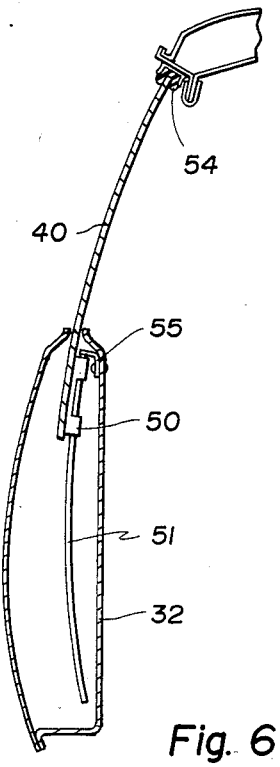
FIG. 6 is a view similar to FIG. 5 showing the door with a new glass panel in raised position relative to a seal.

The seal 54 shown in FIGS. 6 and 7 is illustrated in association with a roof portion of a vehicle but a substantially identical seal section is used on the door opening to engage the forward and rearward edges 42 and 44 of the new glass panel 40. In the case of T-top vehicles, targa top vehicles, and convertibles, any necessary changes may be made to the seal to permit fastening thereof to the removeable roof panel or panels, or to the convertible top side rails.

Other ways of practicing the invention will now be described in connection with FIGS. 9, 10, and 11. Except as is noted, the preceding description is applicable and thus will not be repeated.

Figure 9:
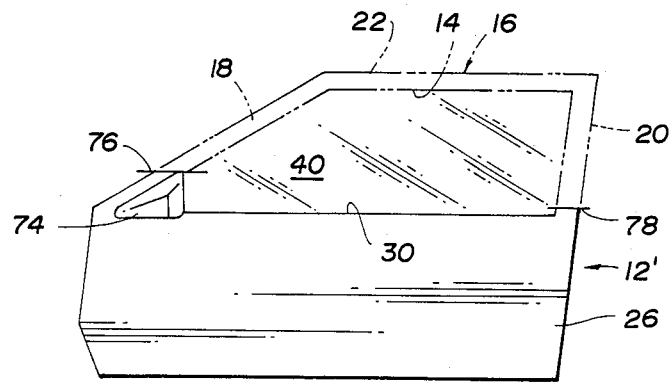
FIG. 9 is a schematic view illustrating the manner in which the front end of the window frame can be cut just above a rear view mirror.

With reference to FIG. 9, another manner of practicing the invention is illustrated on a door 12' whose window frame 16 extends from a rear view mirrow 74 at the front to the rearward frame portion 20 at the rear. Adjacent the front end the door, the window frame 16 is cut at a line 76 just above the rear view mirror 74. Adjacent the rear of the door, the window frame 16 is cut along a horizontal line 78 in the manner described previously. Thus, the front end of the window frame 16 is removed at just a slightly higher elevation than at the rear end of the frame in order to accommodate for the type of door which includes a rear view mirror of the type shown. In all other respects, the conversion of door 12' is the same as previously described in connection with FIGS. 1 through 8.

Figure 10:
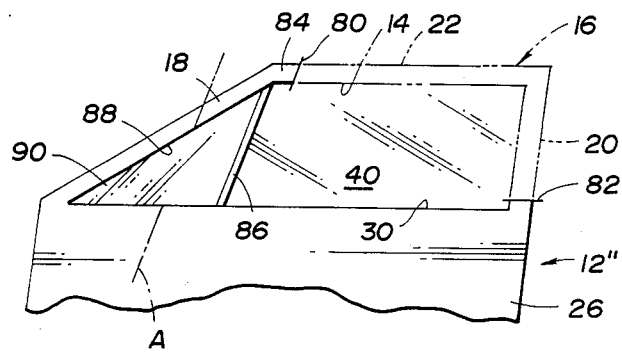
FIG. 10 is a schematic view that illustrates the manner in which a forward portion of the window frame can be left in order to permit installation of a vent window.

With reference to FIG. 10, the door 12" illustrated is converted by cutting the window frame 16 at a front location 80 and a rear location 82. This removal of a portion of the window frame leaves the forward frame portion 18 which extends upwardly from the door and has a rear terminal end 84. Door 12' is further modified by adding a support 86 that extends vertically between the door and the terminal end 84 of the forward portion 18 of the window frame to cooperate therewith in defining a front vent window opening 88. A vent window 90 is installed in the vent window opening 88 and may be fixed in position, supported for opening and closing movement by pivoting about a generally vertical axis A as shown, or supported for opening and closing movement by generally vertical sliding. The main glass window panel 40 is installed rearward of the vertically extending support 86 and has an appropriate size that is much smaller than the original window panel as a result of the installation of the vent window panel 90.

Figure 11:
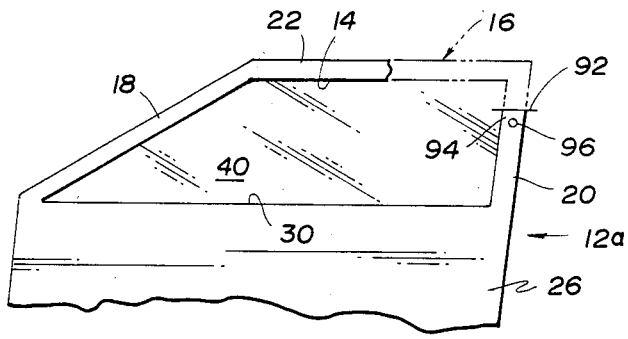
FIG. 11 is a schematic view that illustrates the manner in which a rearward portion of the window frame can be left in order to permit attachment of a restraint belt to the door.

With reference to FIG. 11, each of the previously described conversion methods can also be preformed on the door 12a shown while cutting the rear of the door frame 16 at its rearward portion 20 at a location 92 spaced above the upper edge 30 of the door. Such cutting leaves the rearward door frame portion 20 with an upper terminal end 94 which has a restraint belt attachment point 96. Such attachment is desirable particularly when passive restraint belts systems are utilized with the door. At the forward end of the door frame 16, a cutting operation can be performed and further conversion executed as illustrated and described in connection with FIGS. 3, 9, or 10.

While the proceeding description describes the best modes for practicing the invention, it will be apparent to those skilled in the art that there are other ways of practicing the invention as defined by the following claims.

What is claimed is:

1. A method of converting a sedan body having a door opening which is defined by forward, rearward, and top edge portions and also having a door including an upper edge and a window frame fixedly mounted on the door and having forward, rearward, and top frame portions that cooperate with the upper edge in defining a window opening, the method comprising the steps of: cutting and removing at least part of the window frame, installing a glass window panel in the door, and installing a seal on the sedan body at an edge of the door opening, said glass window panel and seal being constructed such that the installed seal engages the installed window panel when the door is in a closed position.

2. The method of claim 1 wherein the glass window panel utilized has top and side edges that are enlarged with respect to a window panel usable with the window frame.

3. The method of claim 2 wherein the installed glass window panel and the window panel usable with the window frame each have a perimeter different than the other, with the perimeter of the installed glass window panel being greater than the perimeter of the window panel usable with the window frame.

4. The method of claim 3 wherein the glass window panel is enlarged a greater amount at its lower edge than at its top and side edges as compared to a window panel usable with the window frame.

5. The method of claim 2 wherein said window panel is installed through the upper edge of the door after said frame has been removed.

6. The method of claim 1 wherein the seal engages the installed window panel at a location outboard from where an inboard side of the window frame is located with the door closed prior to the removal of at least part of the window frame.

7. The method of claim 6 and further comprising installing a spacer between said seal and the edge of the door opening.

8. The method of claim 7 wherein said spacer disposes said seal at an angle to receive and engage said window panel when the door is moved from an open position to a closed position and when said window panel is moved from an open position to a closed position.

9. The method of claim 1 and further comprising the step of installing a stop element to limit upward movement of said glass window panel.

10. The method of claim 1 and further comprising the steps of installing guide means adjacent a lower edge of the window panel to hold said window panel relatively stable with respect to said door when said window panel is in an upper position.

11. The method of claim 1, 2, or 6 wherein said window frame is cut along a horizontal line substantially in alignment with the upper edge of the door.

12. The method of claim 1, 2, or 6 wherein the window frame is cut to leave a forward frame portion thereof that extends upwardly from the door and has a terminal rear end, the door being further modified by adding a support that extends vertically between the door and the terminal rear end of the forward portion of the window frame to cooperate therewith in defining a front vent window opening, and a vent window glass panel being installed in the vent window opening.

13. The method of claim 1, 2, or 6 wherein the window frame is cut to leave a rearward frame portion that extends upwardly from the door and has an upper terminal end including a restraint belt attachment point.

14. A method of converting a sedan body having a door opening which is defined by forward, rearward, and top edge portions and also having a door including an upper edge and a window frame fixedly mounted on the door and having forward, rearward, and top frame portions that cooperate with the upper edge in defining a window opening, the method comprising the steps of:

cutting the window frame along a horizontal line substantially in alignment with the upper edge of the door; removing the window frame, a glass window panel in the door; and installing a seal at an edge of the door opening, said glass window panel and seal being constructed such that the installed seal engages the installed window panel when the door is in a closed position.

15. The method of converting a sedan body having a door opening which is defined by forward, rearward, and top edge portions and also having a door including an upper edge and a window frame fixedly mounted on the door and having forward, rearward, and top frame portions that cooperate with the upper edge in defining a window opening, the method comprising the steps of: cutting and removing part of the window frame while leaving the forward frame portion which extends upwardly from the door and has a terminal rear end, adding a support that extends vertically between the door and the rear end of the forward portion of the window frame to cooperate therewith in defining a vent opening; installing a vent glass panel in the vent opening; installing a glass window panel in the door rearward of the support; and installing a seal at an edge of the door opening, said glass window panel and seal being constructed such that the installed seal engages the installed window panel when the door is in a closed position.

16. A method of converting a sedan body having a door opening which is defined by forward, rearward, and top edge portions and also having a door including an upper edge and a window frame fixedly mounted on the door and having forward, rearward, and top frame portions that cooperate with the upper edge in defining a window opening, the method comprising the steps of: cutting and removing at least a portion of the window frame while leaving the rearward window frame portion which has an upper end including a restraint belt attachment point; installing a glass window panel in the door; and installing a seal to the edge of the door opening, said glass window panel and seal being constructed such that the installed seal engages the installed window panel when the door is in a closed position.

* * * * *